US006584613B1

United States Patent
Dunn et al.

(10) Patent No.: US 6,584,613 B1
(45) Date of Patent: Jun. 24, 2003

(54) SIMPLIFIED TV VIEWER RESPONSE SYSTEM AND METHOD USING SPECIAL CODES AND SUBSCRIBER CUSTOM CALLING CODES

(75) Inventors: James M. Dunn, Ocean Ridge, FL (US); Peter S. Lee, Calabasas Park, CA (US); Edith H. Stern, Boca Raton, FL (US); Barry E. Willner, Briarcliff Manor, NY (US)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/272,325

(22) Filed: Mar. 19, 1999

(51) Int. Cl.⁷ .................. H04N 5/445; H04N 7/173; H04M 11/00
(52) U.S. Cl. .................. 725/122; 725/60; 725/116; 379/93.12
(58) Field of Search .................. 725/87–100, 109, 725/121, 122, 114–117, 60, 9, 11, 13, 18; 379/93.02, 93.03, 93.05, 93.12, 93.18, 93.26, 355.01, 355.02, 357.01, 357.03

(56) References Cited

U.S. PATENT DOCUMENTS

| 4,071,697 A | * | 1/1978 | Bushnell et al. | 379/93.25 |
|---|---|---|---|---|
| 4,755,872 A | * | 7/1988 | Bestler et al. | 725/116 |
| 4,761,684 A | | 8/1988 | Clark et al. | |
| 4,989,233 A | * | 1/1991 | Schakowsky et al. | 725/13 |
| 5,113,496 A | | 5/1992 | McCalley et al. | |
| 5,345,501 A | * | 9/1994 | Shelton | 379/93.12 |
| 5,473,673 A | * | 12/1995 | Van Wijk et al. | 725/24 |
| 5,630,203 A | * | 5/1997 | Weinblatt | 725/18 |
| 5,640,192 A | * | 6/1997 | Garfinkle | 725/116 |
| 5,721,584 A | * | 2/1998 | Yoshinobu et al. | 725/114 |
| 5,774,534 A | * | 6/1998 | Mayer | 379/142.01 |
| 5,838,682 A | * | 11/1998 | Dekelbaum et al. | 379/93.12 |
| 5,880,720 A | * | 3/1999 | Iwafune et al. | 725/114 |
| 5,917,893 A | * | 6/1999 | Katz | 379/93.02 |
| 5,926,204 A | * | 7/1999 | Mayer | 725/122 |
| 6,014,441 A | * | 1/2000 | Mark | 379/283 |
| 6,122,501 A | * | 9/2000 | Gallant | 455/414 |
| 6,324,273 B1 | * | 11/2001 | Alcott | 379/201.03 |

* cited by examiner

*Primary Examiner*—John Miller
*Assistant Examiner*—Scott Beliveau
(74) *Attorney, Agent, or Firm*—Morgan & Finnegan, LLP; Joseph C. Redmond, Jr.

(57) ABSTRACT

A simplified TV viewer response system coupled to a telephone system enables a viewer/subscriber to respond to television displays by dialing a special code less than six digits. The code is routed to an enhanced services server. The server captures the dial string including the caller ID, checks the caller ID against a subscriber/viewer profile and maps the caller ID to the cable company providing service to the viewer/subscriber. The server delivers the response to the cable television company which processes the response according to the selected items or choices in the TV screen. Several special dialing codes of limited digits expedite viewer/subscriber selections. Each code includes a special character to route the dialing string to the server. The system provides sound recognition of viewer/subscriber selections.

21 Claims, 6 Drawing Sheets

SIMPLIFIED TV VIEWER RESPONSE SYSTEM AND METHOD USING SPECIAL CODES AND SUBSCRIBER CUSTOM CALLING CODES

BACKGROUND OF THE INVENTION

1. Field of the Invention

This invention relates to a television (TV) system for receiving viewer input and methods of operation. More particularly, the invention relates to a simplified TV response system using special telephonic codes and methods of operation.

2. Description of Prior Art

Presently, TV channels often have program content that request the viewer to take some immediate action using a telephone. Examples of this includes types of voting, where you dial an "800" number and then select "1" for YES or "2" for NO. Other examples include advertisements of items for sale where the viewer dials a local or long distance number, then either inputs an alphanumeric item number or exercises an Interactive Voice Response ((IVR) menu. The telephone response is via a 10-digit (in the USA) dialing plan, plus additional digits for additional information. Viewers may be asked to dial one 10-digit number for one answer and another 10-digit number for a different response. The viewer must remember a long dial string and the option desired. As a consequence, a viewer is required to remember from 10–15 digits for a transaction and use of a process which is very awkward and error prone. There is a need to provide a TV response system which is simplified and takes advantage of the intelligent equipment installed in present day telephone systems.

Prior art related to TV response systems include the following:

U.S. Pat. No. 4,761,684 entitled "Telephone Access Display System" issued Aug. 2, 1988, which discloses a program data processor in a telephone system by which a subscriber can select video information to be displayed on a common channel of a cable television system. The subscriber accesses the data processor by use of a touch-tone phone and selects video information to be broadcast by inputting a digital code using his touch-tone telephone. The data processor processes the signal generated, retrieves the video information from memory, and places it on the queue to be broadcast.

U.S. Pat. No. 5,113,496 entitled "Bus Interconnection Structure with Redundancy Linking Plurality of Groups of Processors, with Servers for Each Group Mounted on a Chassis", issued May 12, 1992, discloses an interactive TV channel for viewer response. The viewer dials a telephone number to gain access to the TV system. Each subscriber is given a particular identification number upon subscription to the service. When the identifying number is entered via a touch-tone telephone key pad, the system recognizes the subscriber and his location. The TV displays menus and directories which the subscriber responds to with sequences of key strokes on the telephone. The subscriber may select a particular product of interest, make purchases, or request additional information or help.

None of the prior art discloses a simplified TV viewer response system using special telephonic codes of limited digits and characters in response to displays on a television screen.

SUMMARY OF THE INVENTION

An object of the invention is a simplified TV viewer response system and method of operation.

Another object is a simplified TV viewer response system and method using special telephonic codes of few digits in response to TV displays.

Another object is a simplified cable TV system and telephonic network providing oral response as a viewer selection to items or choices in a TV display.

Another object is a simplified cable TV system and public switch telephone network providing enhanced services for response to special codes provided by a viewer in response to TV displays.

These and other objects, features, and advantages of the invention are achieved in a simplified TV response system including a TV system, e.g. a cable system interacting with a telephone system in which a viewer responds to items or choices in a television display by dialing a special code. The code is routed to and recognized by an enhanced services server. The server captures the dial string and receives the caller ID, checks the caller ID against a subscriber profile in a database which maps the caller ID to the cable system providing service to the subscriber location. The server delivers the response to the cable system which processes the viewer response according to the selections made to the items and choices available in the TV screen. Several special dialing codes of limited digits are disclosed. Each code includes a special character to route the dialing string to the server. The code also includes a viewer selection. The server algorithmically generates the channel number from the viewer telephone and cable profiles. Because star "*" code may have already been assigned, by the telephone company, special characters may be substituted in a given geographical area. One replacement of the star "*" would be any two alphabetic characters to identify the cable company which could then be combined with the channel number and viewer response which may include a multiple indication for the screen display. Another code is a dial string comprising double star "**" signals. The first star signal operates to alert the switch to route the remaining dialed digits to the enhanced special services server. The second star identifies the code as a TV related service. The first character or "X" identifies the item number and the next character or "Y" identifies the channel digits. The "X" and "Y" digits are algorithmically generated by the enhanced services server. A third special dialing stream comprises a double star key entered by the viewer and a selected key for an item as a response to a display. In another embodiment, TV channels are grouped according to responses. One channel group may handle first and second responses. The remaining channel groups can handle other responses. More groups can be added by changing the group pairing, but the dial string has to add more response items, and thus, more digits. Another method is to allow for voice recognition at the server. In this case, the viewer dials "*, *" and waits for an announcement asking for an oral response. The viewer speaks a phrase and hangs up. The cable company puts a high frequency burst of tones or a specific audio track on to the audio portion of a channel displaying a screen. The audio signal can be digital pulses that identify the channel number. The viewer dials "*,*, N" and points the telephone receiver towards the TV. The signal is transmitted to the server which records the audio information, decodes the information, and if a valid channel number is detected, returns a beep or announcement to the viewer to signify a successful transaction. The channel number is combined with the dial string to indicate the item ordered and when combined with the caller identification completes the transaction.

DESCRIPTION OF DRAWING

The invention will be further understood from the following detailed description of preferred embodiment taken in conjunction with the appended drawings in which.

DESCRIPTION OF A PREFERRED EMBODIMENT

Figure 1:
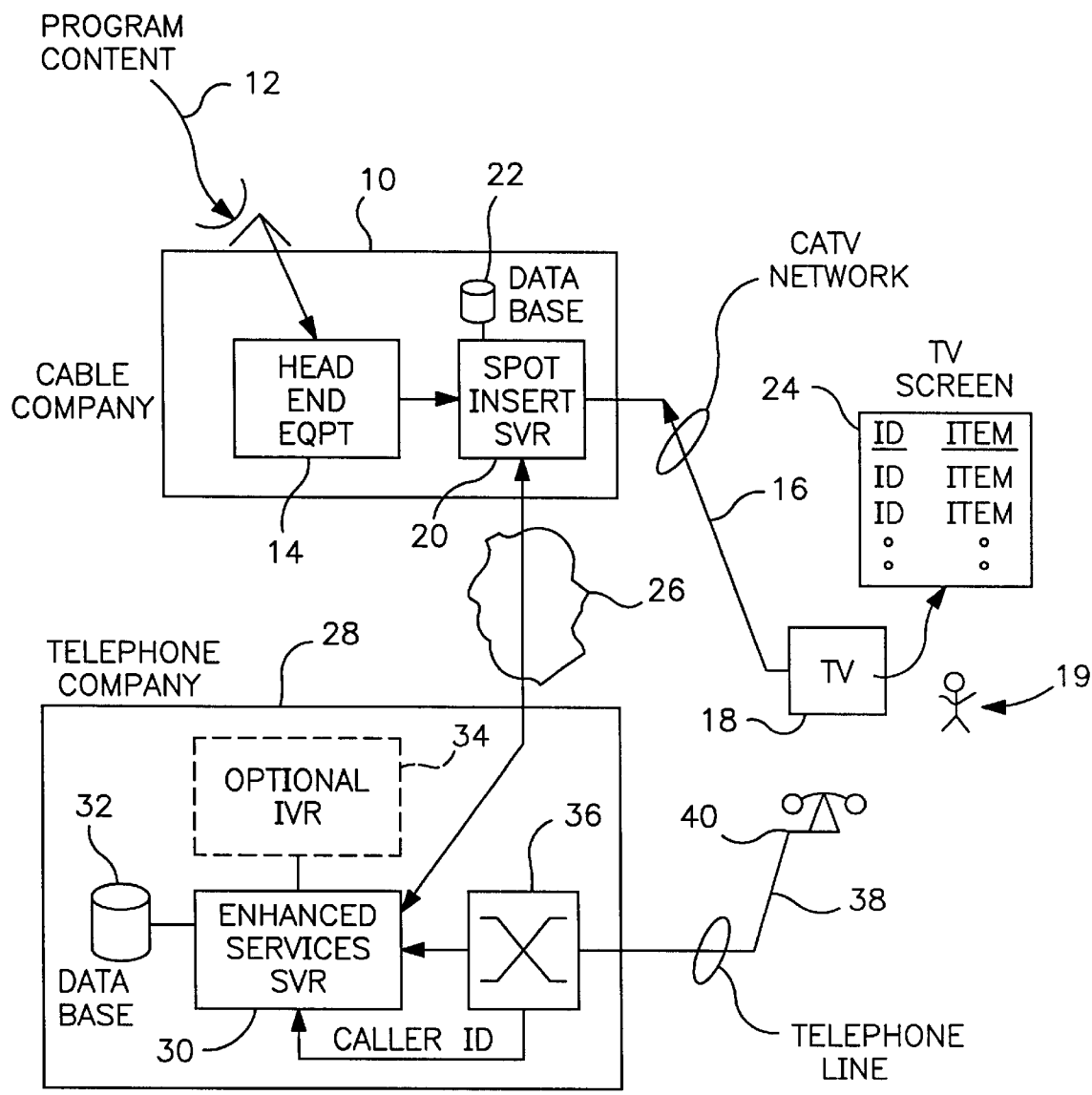
FIG. 1 is a block diagram of a simplified TV viewer response system using special codes for providing responses to displays in a TV system and incorporating the principles of the present invention.

In FIG. 1, a television provider 10, typically a Cable Television (CATV) system acquires programming content 12 from a remote source. The programming content may be acquired in a variety of ways including satellite, local reception, and cable connections from other locations. Standard TV head end equipment 14 places the content on various cable channels distributed over the network 16 to television sets 18 installed in the homes of subscribers 19. A spot insertion server 20 and associated database 22 enables a television provider to insert into the video channels advertisements of items for sale, survey questions, voting selections, etc., force the viewer to take some immediate action. An example of a spot insertion server and database is the IBM Digital Media Distributor available from IBM, Armonk, N.Y.

The advertisements, etc (not shown) appear on the television 18 in a screen 24, along with an identification number and an item description for purposes of selection by the viewer. The provider 10 is coupled through a public switch telephone network 26 to a switching center 28, typically a central office serving the TV viewer. The switching center includes, inter alia an enhanced services server 30 and database 32. Optionally, the center 28 includes an Interactive Voice Response (IVR) unit 34 which will be further described hereinafter. The enhanced services server is coupled to a switch 36 serving the subscribers over a telephone line 38 to a standard pushbutton telephone 40. Alternatively, the line may be connected to a set top box coupled to the television 18. The telephone line includes caller ID which the switch 36 provides to the server 30 when the subscriber uses the receiver in response to selecting an item on the screen 24. Stored in the database 32 is a subscriber profile which in addition to the subscriber number, identifies the location of the subscriber in the geographical area served by the central office 28. The subscriber identification and geographical location is provided to the enhanced services server 30. One enhanced server is the IBM Multi-Services Platform for AIX, ITU Version (IBM MSP), available from IBM, Armonk, N.Y.

The server 30 alters the content, code, protocol or similar aspects of the subscriber transmitted information. Based on the subscriber's information, the server 30 can identify the TV provider 10 serving the subscriber 19 and interact with the server 20 to process a selection to the TV screen 24 made by the subscriber using a receiver 40, typically a telephone or data terminal. The central office 28 can now process the selection made by the subscriber based on the information received from the cable company concerning the items available on the TV screen in a particular slot displayed on the screen. Alternatively, the server 30 could deliver to the server 20 a record of the dialed digits, thus allowing the server 20 to process the order based on the knowledge of what items were available on the channel at a specific point in time. Alternatively, the server 20 can be used for on-line authentication of the order for high valued items and later call back or authentication.

In another case, the viewer can be billed by either the TV provider or the cable company according to his stored profile in the database 22 or 32 stating the usual billing and delivery preferences such as credit card number, mailing address, and the like. The Telephone Company or TV provider could simply add charges to their existing telecom or provider bills. If the billing is done by the TV provider, the Telephone Company has the opportunity to charge a service charge to either the provider or the viewer for assisting in servicing the call. If the billing is done by the telephone company, then the telephone company may obtain some of the billing revenue with the provider obtaining increased advertising revenue based on the greater amount of orders placed for the items due to the ease of use for the viewer.

The present invention allows a subscriber/viewer to select an item for sale or vote, etc by simply picking up the telephone 40 and dialing a special code, e.g "*xxy", (to be described in more detail hereinafter), less than six (6) digits, and hanging up the telephone. The "xx" and "y" digits may be either alpha or numeric. The subscriber/viewer does not need to wait for an answer or navigate an Interactive Voice Response Unit menu. For small items the order is placed automatically. For more expensive items, a call back verification can occur.

Figure 2A:
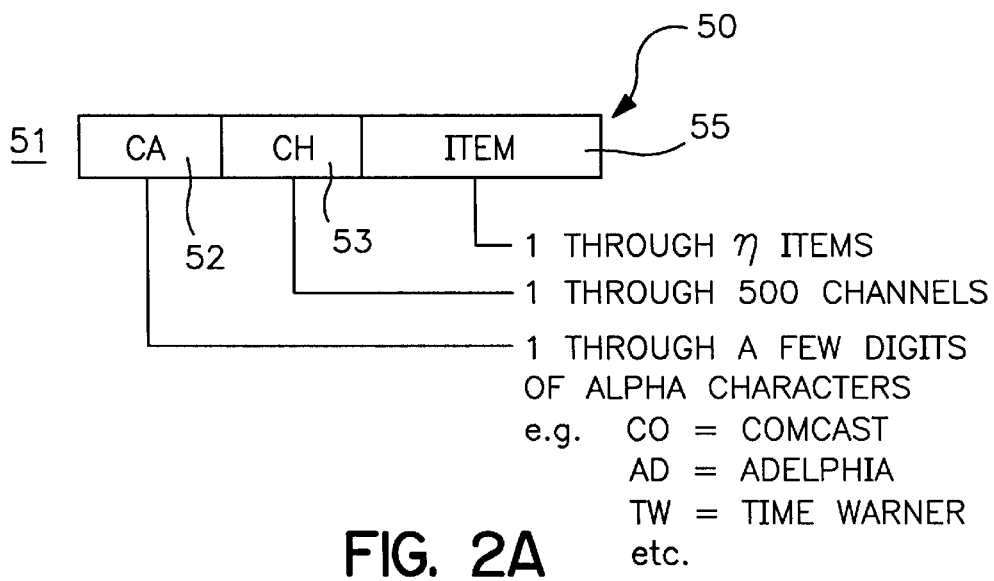
FIG. 2 is a representation of special codes as dial strings in the system of FIG. 1.

In FIG. 2, several alternative dialing methods may be used by the subscriber in making selections to the program content displayed on the screen 24. In FIG. 2A a dial string 50 comprises a frame 51 activated by dialing a star ("*") character. The frame comprises a provider field 52, a channel field 53, and an item field 55. The field 52 provides alpha designations for TV providers, for example, CO=COMCAST; AD=Adelphia; TW=Time-Warner; etc. The field 53 provides the provider channel number. The field 55 is the item(s) selected by the subscriber. The identification of providers using plural alpha characters can avoid the already assigned star ("*") codes in given geographical areas. Since providers are today geographically located, that is, only one provider is active in a specific service area, the subscriber's geographic location included in his subscriber profile stored in the database 32 (see FIG. 1) enables the server 30 to identify the provider involved in the transaction. If future regulations allow multiple cable carriers to service the same area, the enhanced services server can use caller ID to identify a specific user with a specific cable provider assignment in its database.

Allowing for the current 188 and future 500 channels, and for "N" items per screen, the dial string becomes "plus two digits, plus three digits, plus "N" digits; a minimum string of six digits. However, all possible combinations of channel, items, and cable companies are explicitly included in this methodology. Based on the time of day the string 50 is dialed, the server 30 can determine how to interpret the string, since the star and first two digits are consistent across all calls. After this, some restrictions must be followed, or combinations would not be allowed due to inability to separate channels from items. For example, the numerals "4, 5, 6" could be channel 45, item 6 or channel 4, item 56. In practice, this is not a problem, since only a limited number of items, probably less than 9, can occupy one screen before the viewer becomes distracted. With this limitation, the string is parsed right to left, after which the star and the first two digits are removed. This methodology uses the item number and the channel number. If the channel number is already alpha-numeric (e.g., NBC is used instead of Channel 5), the above methodology still produces the correct result.

Figure 2B:
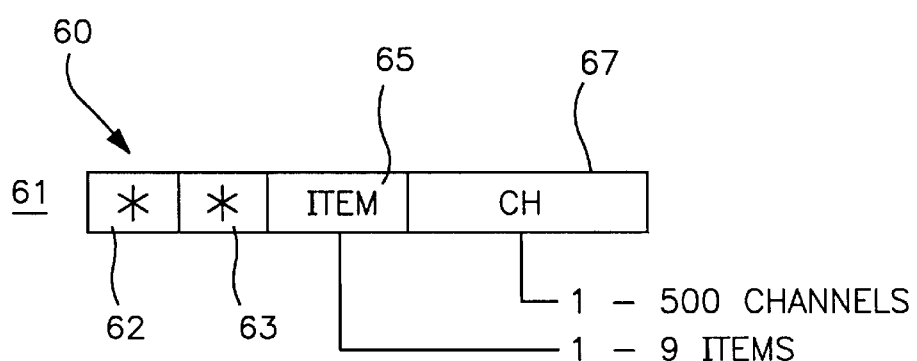

In FIG. 2B, a dial string 60 in a dialing frame 61 includes star fields 62 and 63; item field 65 and channel field 67. In this case, the dial string is "**XYYY". The star field 62 operates to alert the switch 36 (see FIG. 1) to route the remaining dial string to the server 30. The second star field 63 identifies a TV related service to the server 30. The item field or "X" identifies the item number (1–9) and the channel field or "YYY" identifies the channel number. The frame is parsed left to right by the server 30.

Figure 2C:
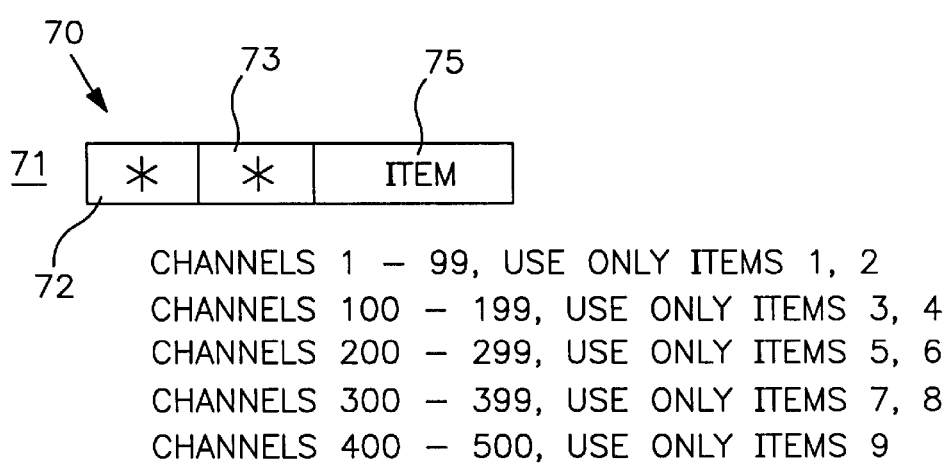

In FIG. 2C, a dial string 70 in a frame 71 includes a first star field 72; a second star field 73, and an item field 75. To eliminate the channel field, channel grouping is employed. Thus, channels 1–99 are only applicable to selection items 1 and 2 in the TV screen 24 (See FIG. 1). Channels 100–199 are only applicable to items 3, 4 in the screen 24. Thus, channels are grouped such that only certain items are permitted to be made available on certain channels at specific advertisement time slots. For example, items 1 and 2 are available for placement on any channel in the group of channel 1 through channel 9, but nowhere else. So, in the lowest set of channels, two channels can have one item, or one channel can have two items. The others are grouped in the same way. This methodology creates valuable "slots" in each ad's time period since a limited number of channels can have a limited number of items. The methodology also shortens the dial string to "**N" where "N" is an item number. If the provider desires, more slots can be added by changing the group/slot pairing, but then the dial string has to add more item numbers and hence, more digits. This method requires near real time editing at the provider to add the currently accurate dial string to the TV ad screen.

Figure 3:
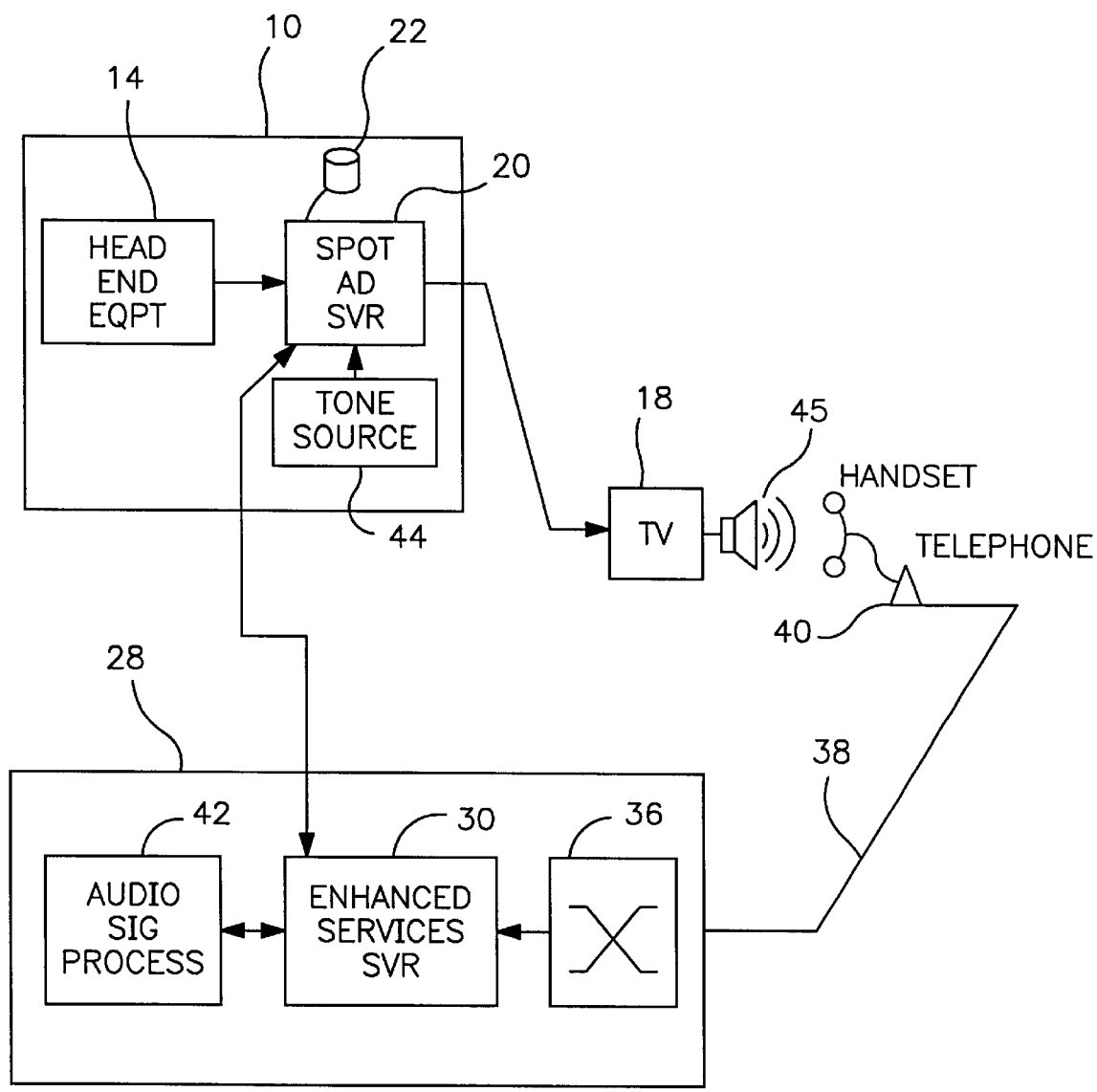
FIG. 3 is a modification of FIG. 1 including an audio signal processing system for responding to viewer selections of audio signals accompanying TV displays and indicative of selections available to the viewer.

In FIG. 3, an audio signal processing facility 42 is included in the central office 28 and coupled to the server 30. Alternatively, the signal processor 42 could be incorporated into the server 30 in the form of Digital Signal Processor chips (DSPs) using digitizing and analyzing audio content processes well-known in the art. An audio source 44, e.g. tone, music. etc. is included in the TV provider 10 and coupled to the server 20.

In addition to dialing a code for selecting an item displayed on the TV, the system of FIG. 3 enables the provider, in one form, to transmit an audio signal 45, e.g. a high frequency burst of tones or a specific audio track from the source 44 onto the audio portion of the channel displaying the advertisement. The audio signal 45 could be digital pulses, in the range of several milliseconds in length, that identify the channel number; or it could be easily distinguished background music such as different tunes, vocalists, musical styles, etc.

The viewer again dials into the telephone system 28, described in conjunction with FIG. 2, followed by pointing the telephone receiver 40 toward the TV. The burst of tones or audio track is picked up and transmitted by the receiver to the audio signal processor 42. After processing the audio signal into a digital counterpart, the server 30 decodes the signal for the channel number, and if a valid channel number is detected, the server 30 returns a "beep" or an announcement to the subscriber to signify a successful transaction. The decoded channel number is combined with the dial string to indicate the item ordered and then further combined with the caller identification to complete the transaction.

Figure 4:
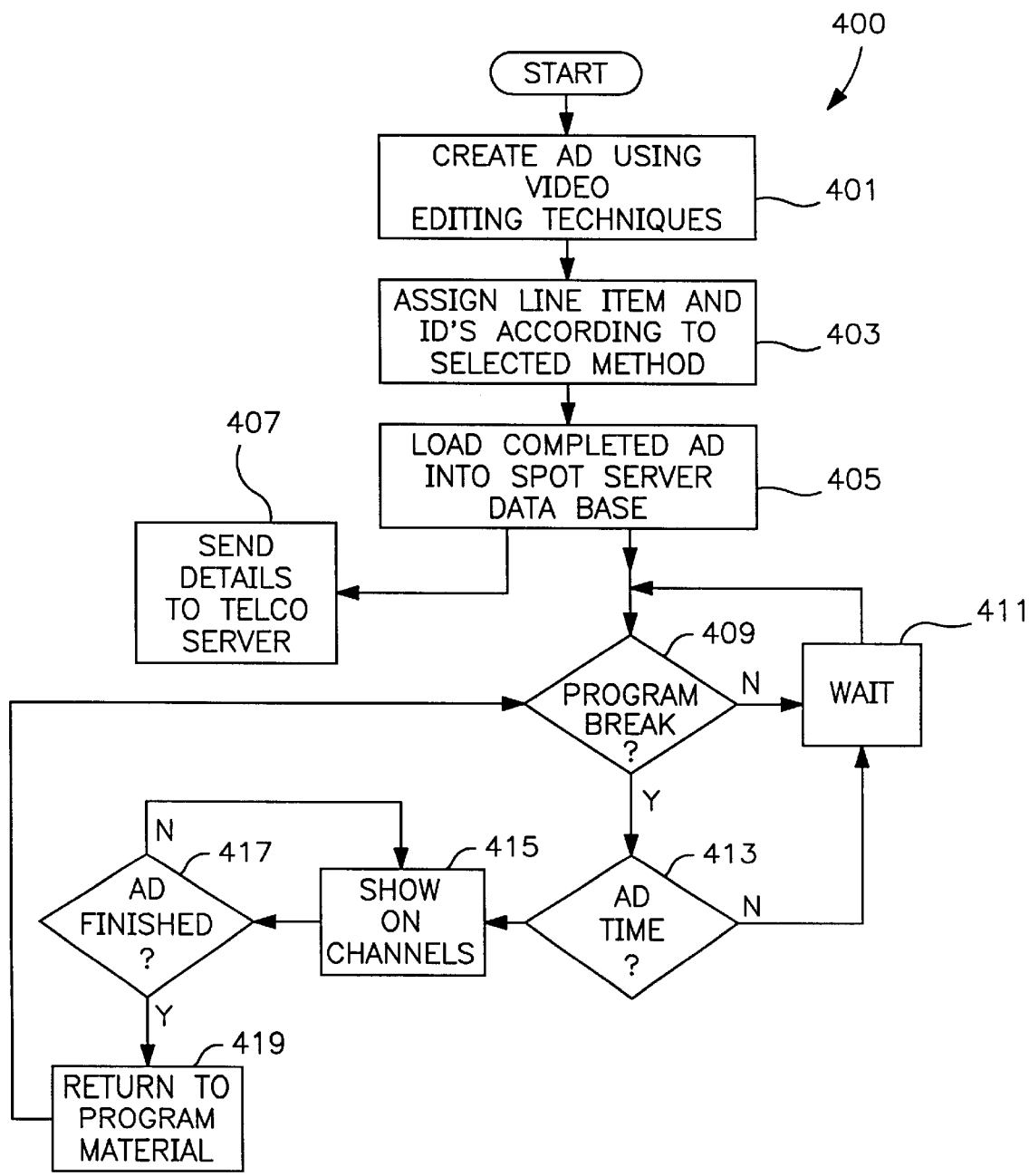
FIG. 4 is a flow chart for TV displays provided to viewers for the purposes of making selections available in the TV displays.

Turning to FIG. 4, a process 400 is described for creating and displaying an advertisement or a survey or voting form seeking information for which the advertiser requires feedback from the subscriber. In step 401 the advertiser creates the advertisement or form or other information using standard video editing techniques. In step 403, the advertiser incorporates into the advertisement a line item and an ID for a sale item or an electronic button for subscriber response in the case of form. The completed ad is loaded into a server database 22 (see FIG. 1) in a step 405, after which the advertisement or form details are provided to the server 30 (see FIG. 1) in step 407. In a test 409, the head end equipment is monitored for a program break. A "no" condition initiates a waiting state 411 which after a selected time period returns the program to the program break test in step 409. A "yes" condition for the test step 409 activates the spot server 20 (See FIG. 1) to insert the ad into one or more selected TV channels in an AD Time test step 413. A "no" condition returns the process to the waiting step 411. A "yes" condition, initiates an operation 415 to show the advertisement on the selected TV channels serving the subscriber/viewers. The spot server is tested in a step 417 to determine if the ad has been completed. A "no" condition returns the program to step 415 which continues the spot server in the channel until the ad is finished, after which a "yes" condition initiates an operation 419 to return the program to the program break test 409.

Figure 5A:
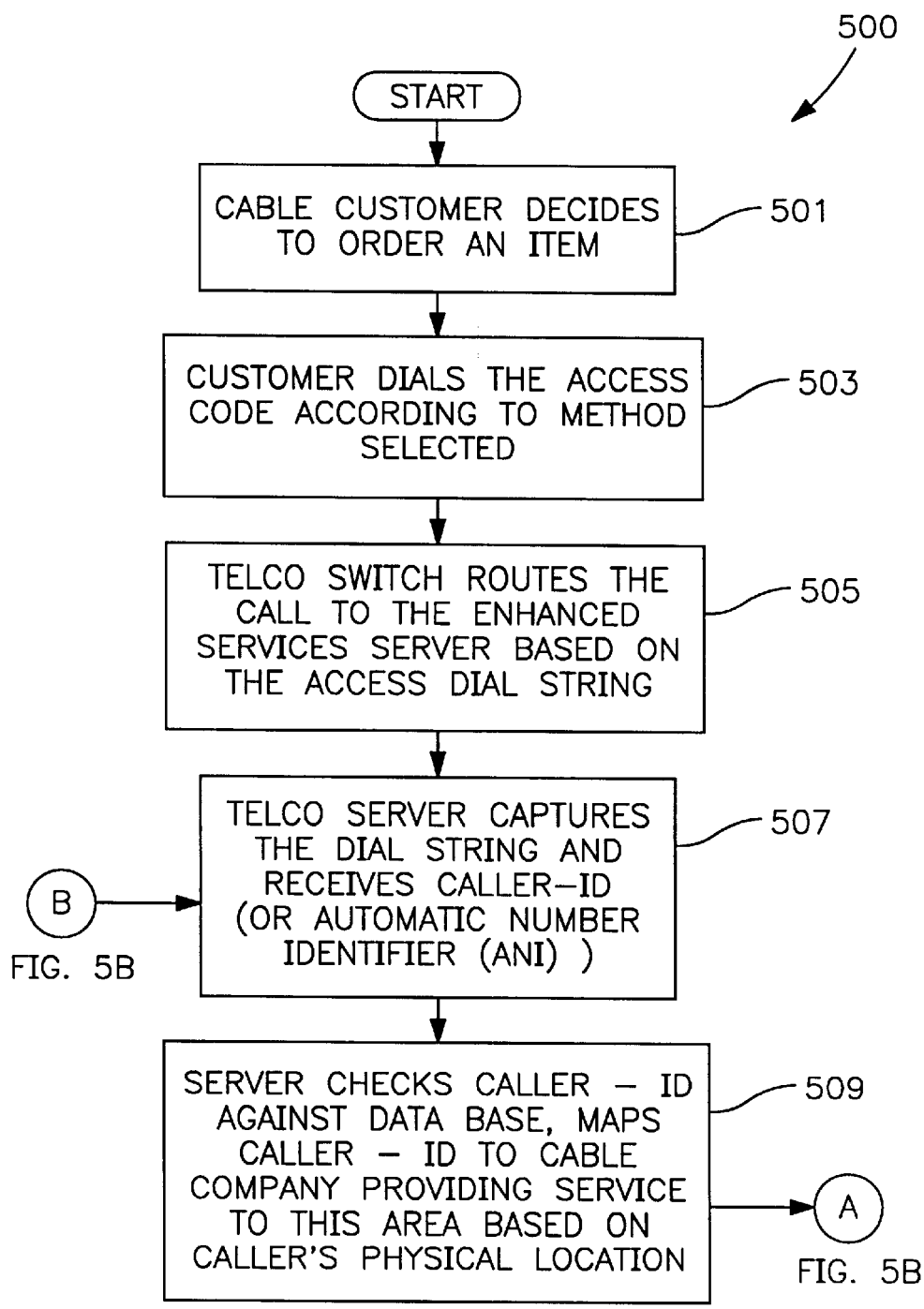
FIGS. 5A and 5B are flow charts for a TV viewer ordering process using enhanced services of a telephone company.
Figure 5B:
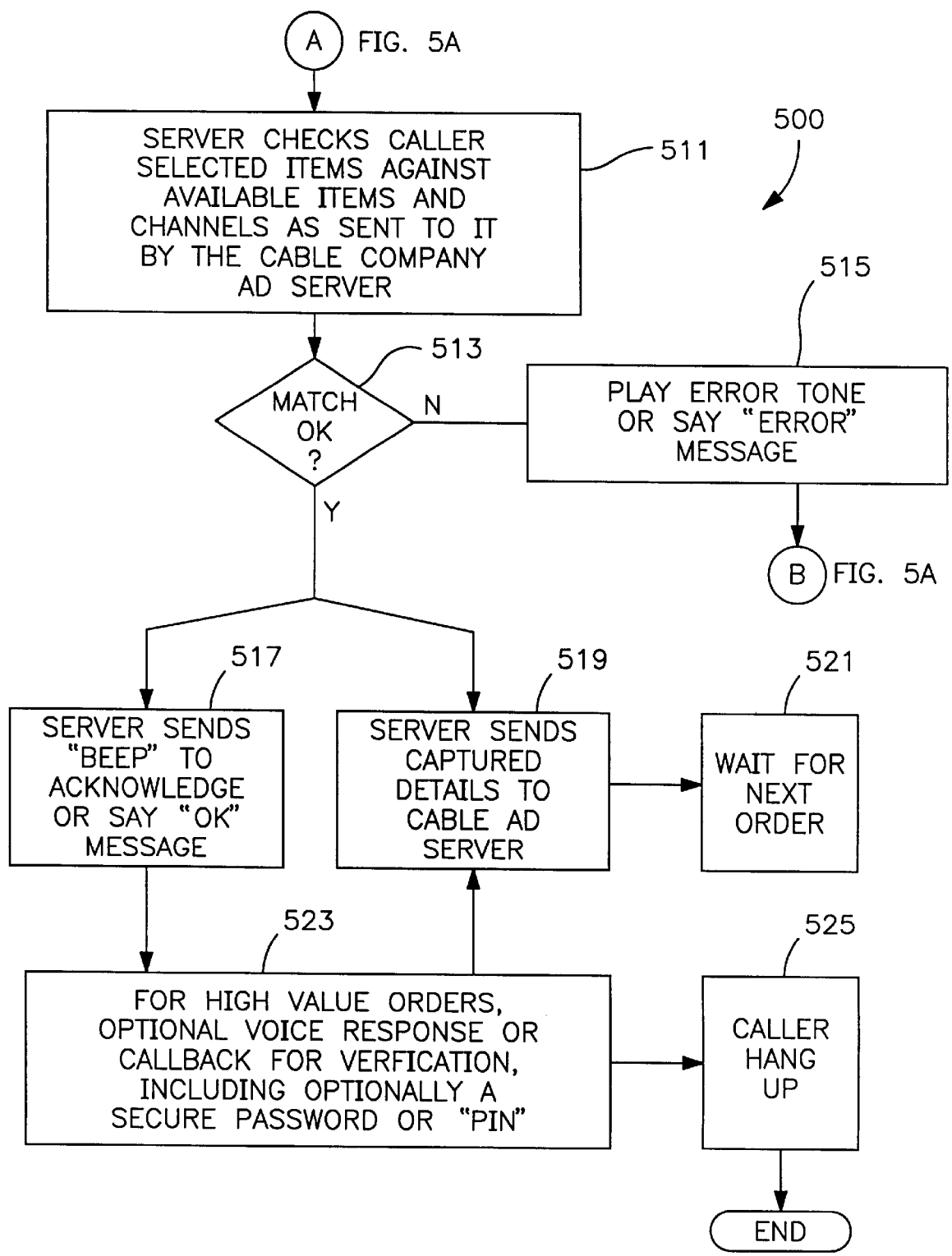

A subscriber ordering process 500 will described in flow charts of FIGS. 5A and 5B, taken in conjunction with FIG. 1. In FIG. 5A, the subscriber makes a selection from the TV screen 24 (see FIG. 1) in step 501 and in step 503, dials the access code using one of the dialing strings shown and described in FIGS. 2A, 2B and 2C. In step 505, the dialing string is processed by the switch 36 and delivered to the server 30. In step 507, the server 30 captures the dial string and receives the caller ID for the subscriber from the switch 36. The server algorithmically checks the caller ID against a database 32 and using the subscriber profile stored in the database 32 maps the caller ID to the TV provider serving the area in which the subscriber is physically located. In one form, the server uses the subscriber's physical address contained in the subscriber profile to map the address against the TV provider area defined in the database.

Turning to FIG. 5B, in step 511, the server accesses the advertisement details transmitted by the server 20 (see FIG. 4, step 407) to the server database 32. Continuing in FIG. 4, the server compares the subscriber selected item contained in the dialing frame against the available items for the channel as described in FIG. 4, step 407. Returning to FIG. 5B, in a test 513, the server 30 matches the subscriber's selection to the available item or information contained in the advertisement and stored in the database 32. For a response selection, a "no" condition initiates an error tone which is provided to the subscriber in an operation 515 after which the process returns to step 507 in FIG. 5A. A "yes" condition indicates a match and the.server either sends a "beep" to the subscriber in step 517 to acknowledge or say the transaction is completed alternatively, the server sends the captured selection details to the spot server 20 for order processing in step 519 after which the server 20 waits for the next order in a step 521. For selections made in step 517 having a high value, or voice response selected, or requiring call back verification, a secure password or Personal Identification Number (PIN) is collected in a step 523 and provided to the server 30 for processing by the ad's server, according to the validity of the PIN, after which the caller "hang up" takes place in step 525. The process then returns to step 501.

The invention further contemplates programming the server 30 to treat dialing strings limited within a certain range in a customer specific manner. In one example, the customer may dial "*1" in which the telephone office switch 36 sees "*" and routes the call and the caller ID to the server. The server is programmed to interpret the "*" based on the caller ID and activates the caller profile. Another dialed character, e.g. the numeral "1" would be interpreted by the server against the profile to mean "call back the last number". If another subscriber dials "* 1", the numeral "1" could be interpreted against his profile to mean something entirely different perhaps "speed dial 555–1212". Today, all subscribers get the same reaction within a given server area to the codes, but need not be the case if the server is programmed to respond to specific codes identified in the subscriber's profile.

Summarizing, A television provider and central office interact to allow a subscriber to use the telephone network as a feedback channel to the TV network using special codes of few digits or audio signals for selection of items or choices on a TV display. The invention contemplates adding local content to a subscriber screen that can be selected and ordered over the phone using these special codes or audio tones interpreted by an enhanced server in the telephone central office. The codes, limited in dialing digits, minimize user interaction with the system, while positively identifying both the user and an item selected or a choice made. A subscriber profile stored in a database enables the enhanced server to interact with the profiles and the dialing strings to algorithmically identify the TV provider serving the subscriber and capture the subscriber selection of purchase items or indications of a choice made the subscriber from the special codes of few digits. The special codes may also be used by the subscriber to program the server to perform special calling services for the subscriber taken from the subscriber profile stored in the database coupled to the enhanced server.

While the invention has been described in a specific embodiment, various changes can be made therein without departing from the spirit and scope of the invention as defined in the appended claims, in which:

We claim:

1. A simplified Television (TV) viewer response system comprising:
    a TV provider delivering TV program content in channels to a TV display for a viewer/subscriber;
    a telephone system coupled to the TV provider and to the viewer/subscriber through a terminal;
    means for generating special dialing strings to identify the TV provider, channel, selections and choices made by a viewer/subscriber to information included in the TV program content and shown in the TV display; and
    an enhanced services server means included in the telephone system responsive to the special dialing codes for algorithmically generating the identity of the TV provider; a channel number viewed by the viewer/subscriber and combining with the viewer/s subscriber identity and selection as a viewer/subscriber response to the information in the TV display, the server interacting with a spot server at the TV provider to process the selection made by the viewer/subscriber to the information in the TV display.

2. The system of claim 1 wherein the spot server generates information as a part of the program content delivered to the TV display for viewer/subscriber selection of items displayed or selection of choices by the viewer/subscriber and processes the viewer/subscriber response based on the program content.

3. The system of claim 1 further comprises:
    database means at the enhanced services sever for storing viewer/subscriber profiles identifying the TV provider, geographical location, and other information related to the viewer/subscriber.

4. The system of claim 1 further comprising a frame containing the dialing string in which the frame contains a field for a special access code; a field for a TV channel number; and a field for an item selected or choice made where the frame is limited to less than 10 digits.

5. The method of claim 4 wherein the dial string includes the special code; an item selection field and channels are grouped according to the selection field to eliminate the channel field.

6. The system of claim 1 further comprises:
    a frame of dialing strings, one string including a double star ("**") signal as an access code indicative of a viewer/subscriber selection of an item displayed in a channel delivering program content to the TV display.

7. The system of claim 1 further comprising a frame identifying channels by item numbers occurring in the frame.

8. The system of claim 1 further comprises:
    a frame containing the special dialing string including a double star ("**") characters, the first star character alerting the server to route the remaining dialed digits to the enhanced services server; the second star signal identifying the code as a TV related service.

9. The system of claim 1 further comprises:
    an Interactive Voice Response (IVR) unit in the enhanced services server and a tone generator included in the TV provider, the tone generator transmitting to the viewer/subscriber an audio signal indicative of a channel number.

10. The system of claim 9 further comprises:
    means for enabling the viewer/subscriber to return the audio signal as a response to an item or a form displayed on the TV screen.

11. The system of claim 10 wherein the enhanced services server records the audio response of the viewer/subscriber and returns an audio signal or announcement to the viewer/subscriber to signify a viewer selection.

12. The system of claim 11 wherein the enhanced services server combines the dialing string with viewer/subscriber profiles stored in the database to determine a selection or choice made by the viewer/subscriber to information displayed in the TV display.

13. The system of claim 1 wherein the server means recognize and interpret special dialing codes in the dialing string against a viewer/subscriber profile for special telephone services executable by the telephone system in behalf of the viewer/subscriber.

14. The system of claim 13 wherein the server means interprets the special dialing codes and caller ID and using the viewer/subscriber profile maps the caller ID to the TV provider serving the area in which the viewer/subscriber is located.

15. The system of claim 1 further comprises: alphabetic characters in the special dialing string for designating a TV provider in a frame.

16. In a simplified Television (TV) viewer response system including a TV provider generating information containing items for selection on a channel delivered to a viewer/subscriber on a TV display; a telephone system including an enhanced services server and a terminal for viewer/subscriber response to items or choices displayed on the TV display, a method for selection of items or choices in the TV display, comprising the steps of:

creating and using video editing techniques for displaying information for selections of items or choices by viewer/subscriber;

dialing a string of pulses including a special access code as a selection of an item or choice in the information by the viewer/subscriber;

routing the response to an enhanced services server in the telephone system based upon the access code;

algorithmically generating in the enhanced server the identity of the TV provider channel number from a viewer/subscriber profile stored in a database in the telephone system based upon the access code;

interacting between the enhanced server and a spot server at the TV provider to process the selection made by the viewer/subscriber to the information in the TV display;

checking the viewer/subscriber selected items or choices by the enhanced services server against available items or choices in the information generated by the TV provider;

sending an acknowledgement to the viewer/subscriber by the enhanced services server if the selected items or choices match the available items or choices; and sending the selected items or choices to the TV provider by the enhanced services server for appropriate response to the viewer/subscriber.

17. The method of claim 16 further comprising the steps of:

transmitting an audio tone on the channel displaying an item or information on a TV display for selection or choice by the viewer/subscriber;

dialing a string of pulses including a special code on the telephone system by the viewer/subscriber; and pointing the telephone receiver to the TV display to transmit the tone to the telephone system as indication of viewer/subscriber selection or choice to the TV display.

18. The method of claim 17 further comprising the steps of:

returning a sound or announcement to the viewer/subscriber to signify a successful transaction; and combining the viewer/subscriber caller ID and the special code to complete the transaction.

19. The method of claim 17 wherein the string of pulses comprises two digits plus three digits plus "N" digits where the two digits is the special code; the three digits is a channel number and "N" digits is a selection or choice by the subscriber/viewer.

20. The method of claim 16 wherein the dialing string includes "*" as a first field; "*" as a second field; an item field and a channel field.

21. The method of claim 16 wherein the dialing string is in a frame including "alphabetic descriptors of TV providers" in a first field; a channel number in second field and a viewer/subscriber selection or choice in third field.

\* \* \* \* \*